United States Patent
Kang et al.

(10) Patent No.: US 12,234,005 B2
(45) Date of Patent: Feb. 25, 2025

(54) SYSTEM FOR CONTROLLING PROPELLER AND ROTOR RPM OF AERIAL VEHICLE HAVING MULTIPLE POWER DEVICES

(71) Applicant: KOREA AEROSPACE RESEARCH INSTITUTE, Daejeon (KR)

(72) Inventors: Youngshin Kang, Daejeon (KR); Am Cho, Daejeon (KR); Bumjin Park, Daejeon (KR); Seongwook Choi, Daejeon (KR); Sam Ok Koo, Cheongju-si (KR); Chang Sun Yoo, Sejong-si (KR); Yushin Kim, Seoul (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 311 days.

(21) Appl. No.: 17/757,357

(22) PCT Filed: Nov. 26, 2020

(86) PCT No.: PCT/KR2020/016917
§ 371 (c)(1),
(2) Date: Jun. 14, 2022

(87) PCT Pub. No.: WO2021/125607
PCT Pub. Date: Jun. 24, 2021

(65) Prior Publication Data
US 2023/0026233 A1   Jan. 26, 2023

(30) Foreign Application Priority Data
Dec. 20, 2019   (KR) .................. 10-2019-0171832

(51) Int. Cl.
*B64D 31/12*   (2006.01)
*B64C 11/30*   (2006.01)
(Continued)

(52) U.S. Cl.
CPC ............ *B64C 11/305* (2013.01); *B64C 27/56* (2013.01); *B64D 31/12* (2013.01); *B64U 50/19* (2023.01)

(58) Field of Classification Search
CPC .............................. B64D 31/12; B64C 11/305
See application file for complete search history.

(56) References Cited

U.S. PATENT DOCUMENTS 9,663,236 B1 *   5/2017   Shiosaki ............... B64C 39/024
2008/0294305 A1 *   11/2008   Roesch ............... G05D 1/0858
                                                                        701/3
(Continued)

FOREIGN PATENT DOCUMENTS

JP        H07246999 A        9/1995
JP        2005349871 A       12/2005
(Continued)

OTHER PUBLICATIONS

KR 2019-0066398A (Choi et al.)—machine translation (Year: 2019).*
(Continued)

*Primary Examiner* — Dino Kujundzic
(74) *Attorney, Agent, or Firm* — McCoy Russell LLP

(57) ABSTRACT

Provided is a system for controlling an RPM of a propeller and a rotor of a flight vehicle having multiple power units including: a collective pitch angle command generating unit generating a collective pitch angle command upon receiving a thrust control command from a pilot or an automatic controller; a disturbance factor compensating unit for generating an RPM compensation electronic speed control (ESC) command for compensating for an RPM error, and an electronic speed adjustment command generating unit generating a final ESC command upon receiving a collective command input or derived in the process of generating the collective pitch angle command by the collective pitch angle command generating unit and the RPM compensation ESC (Continued)

command generated by the disturbance factor compensating unit. RPMs of motors of a flight vehicle having a plurality of propellers and rotors may be maintained to be the same.

9 Claims, 4 Drawing Sheets

(51) Int. Cl.
*B64C 27/56* (2006.01)
*B64U 50/19* (2023.01)

(56) References Cited

U.S. PATENT DOCUMENTS

| | | | |
|---|---|---|---|
| 2009/0097959 A1* | 4/2009 | Vos | F02C 9/44 |
| | | | 415/118 |
| 2011/0226892 A1* | 9/2011 | Crowther | B64C 15/02 |
| | | | 244/17.23 |
| 2015/0367950 A1* | 12/2015 | Rajashekara | F01D 7/02 |
| | | | 903/930 |
| 2017/0210461 A1* | 7/2017 | Siu | B64C 27/10 |
| 2017/0300067 A1* | 10/2017 | Douglas | G05D 1/0858 |
| 2018/0327083 A1* | 11/2018 | Lisio | B64D 31/00 |
| 2020/0088112 A1* | 3/2020 | Tang | B64D 31/06 |
| 2020/0165983 A1* | 5/2020 | Chahal | F02C 9/58 |
| 2021/0024208 A1* | 1/2021 | Tao | B64D 27/24 |
| 2022/0163978 A1* | 5/2022 | Moon | G05D 1/0858 |

FOREIGN PATENT DOCUMENTS

| | | |
|---|---|---|
| KR | 20130097279 A | 9/2013 |
| KR | 20190014955 A | 2/2019 |
| KR | 20190066398 A | 6/2019 |
| WO | 2018037795 A1 | 3/2018 |

OTHER PUBLICATIONS

ISA Korean Intellectual Property Office, International Search Report Issued in Application No. PCT/KR2020/016917, Feb. 24, 2021, WIPO, 4 pages.

* cited by examiner

SYSTEM FOR CONTROLLING PROPELLER AND ROTOR RPM OF AERIAL VEHICLE HAVING MULTIPLE POWER DEVICES

CROSS REFERENCE TO RELATED APPLICATIONS

The present application is a U.S. National Phase of International Application No. PCT/KR2020/016917 entitled "SYSTEM FOR CONTROLLING PROPELLER AND ROTOR RPM OF AERIAL VEHICLE HAVING MULTIPLE POWER DEVICES," and filed on Nov. 26, 2020. International Application No. PCT/KR2020/016917 claims priority to Korean Patent Application No. 10-2019-0171832 filed on Dec. 20, 2019. The entire contents of each of the above-listed applications are hereby incorporated by reference for all purposes.

TECHNICAL FIELD

The following disclosure relates to a system for controlling a revolutions per minute (RPM) of a propeller or a rotor of a flight vehicle having multiple power units, and in particular, to a control system including an algorithm enabling a flight vehicle having one or more electric power units to fly stably by minimizing a difference of powers generated by respective electric motors in the flight vehicle.

BACKGROUND

In general, an unmanned aerial vehicle supplies power to a propeller or a rotor using an engine, and at this time, power is transmitted mechanically through a drive shaft and a gear device, so there is no difference in power transmitted to two or more propellers or rotors.

Therefore, by constantly maintaining the number of turns by controlling a collective pitch angle of blades (rotating blades) of each propeller or rotor, a difference in thrust between the propeller and the rotor may be eliminated, and at this time, force imbalance caused due to a collective pitch angle correction error may be adjustable through a posture controller.

However, in a flight vehicle having distributed propulsion electric power, power individually generated by a plurality of separated motors is gathered to generate single power, and thus, it is difficult to uniformly maintain thrust of each independent propeller or rotor and an output of each motor should be corrected before being mounted in flight vehicle, and it is difficult for each motor to obtain a uniform output even after the output of the motor is corrected, and thus, a lot of compensation work is required for an independent motor to generate a uniform output.

Therefore, the need for a new control system that may solve these problems has emerged.

RELATED ART DOCUMENT

KR2019-0014955A ("Apparatus and method for controlling propeller pitch angle", published on Feb. 13, 2019)

SUMMARY

An exemplary embodiment of the present invention is directed to providing a system for controlling a revolutions per minute (RPM), capable of obtaining the same output by maintaining the RPM of each motor equally, without correcting an output of an individual motor in a flight vehicle in which a plurality of motors are used.

In one general aspect, a system for controlling an RPM of a propeller and a rotor of a flight vehicle having multiple power units includes: a collective pitch angle command generating unit generating a collective pitch angle command upon receiving a thrust control command from a pilot or an automatic controller, a disturbance factor compensating unit generating an RPM compensation electronic speed control (ESC) command for compensating for an RPM error; and an electronic speed adjustment command generating unit generating a final ESC command upon receiving a collective command input or derived in the process of generating the collective pitch angle command by the collective pitch angle command generating unit and the RPM compensation ESC command generated by the disturbance factor compensating unit.

The collective pitch angle command generating unit may include a thrust control command input unit receiving the thrust control command; and an angle adjustment range determining unit generating an angle control command based on the thrust control command input from the thrust control command input unit.

The collective pitch angle command generating unit may further include a first limiter generating an angle range command by limiting one or more of an uppermost or lowermost limit of the angle adjustment range of the propeller based on the angle adjustment command generated by the angle adjustment range determining unit.

The collective pitch angle command generating unit may further include: a direct thrust control command input unit receiving a direct thrust control command of a posture controller; and a first command combining unit generating a collective command, which is a first combination command in which the direct thrust control command input from the direct thrust control command input unit and the angle range command generated by the first limiter are combined.

The collective pitch angle command generating unit may further include a collective schedule input unit receiving a collective schedule according to an increase in speed; and a second command combining unit a second combination command in which the collective schedule input through the collective schedule input unit and the collective command combined in the first command combining unit are combined.

The collective pitch angle command generating unit may further include a second limiter generating the collective pitch angle command by limiting a mechanical angle adjustment range of the propeller based on the second combination command generated by the second command combining unit.

The disturbance factor compensating unit may include: a target rotation speed checking unit checking a target RPM; a current rotation speed checking unit measuring a real-time RPM; and a rotation speed change rate limiting unit generating an RPM limiting signal by changing information on the target RPM with a constant rate of change for a specified time in response to flight conditions.

The disturbance factor compensating unit may further include: a third command combining unit generating an RPM compensation signal, which is a third combination command for RPM compensation based on a difference between the RPM of the RPM limiting signal generated by the rotation speed change rate limiting unit and the RPM of the information on the real-time RPM measured by the current rotation speed checking unit; a third limiter generating an RPM limit compensation signal by limiting a range of the RPM compensation signal generated by the third command combining unit; and an RPM compensation ESC command generating unit generating an RPM compensation ESC command, which lowers an RPM error, by multiplying the RPM limit compensation signal generated by the third limiter by a proportional-integral gain.

The electronic speed adjustment command generating unit may include a collective-ESC command changing unit receiving the collective command generated by the first command combining unit of the collective pitch angle command generating unit and changing the received collective command into a conversion ESC command so that a constant RPM may be maintained.

The electronic speed adjustment command generating unit may include a fourth command combining unit generating a disturbance error compensation ESC command, which is a fourth combination command, in which the RPM compensation ESC command generated by the RPM compensation ESC command generating unit of the disturbance factor compensating unit and the conversion ESC command generated by the collective-ESC command changing unit are combined; a voltage strength compensating unit generating a voltage strength compensation ESC command by compensating for a voltage strength varying depending on a battery charge amount according to the disturbance error compensation ESC command generated by the fourth command combining unit; and a fourth limiter generating a final ESC command by limiting the voltage strength compensation ESC command generated by the voltage strength compensating unit to a range acceptable to an ESC controller of the motor.

The final ESC command generated by the fourth limiter may be transmitted to the ESC controller of the motor.

Other features and aspects will be apparent from the following detailed description, and the drawings.

DETAILED DESCRIPTION

Advantages and features of the present invention and methods of accomplishing the same will be apparent by referring to exemplary embodiments described below in detail in connection with the accompanying drawings. However, the present invention is not limited to the exemplary embodiments disclosed below and may be implemented in various different forms. The exemplary embodiments are provided only for completing the disclosure of the present invention and for fully representing the scope of the present invention to those skilled in the art. Exemplary embodiments of the present invention will be described in detail with reference to the accompanying drawings. Irrespective of the drawings, like reference numbers refer to like elements.

In the following description, if a detailed description of the relevant known functions or configurations is determined to unnecessarily obscure the gist of the present disclosure, the detailed description will be omitted. The terms used henceforth are defined in consideration of the functions of the disclosure and may be altered according to the intent of a user or operator, or conventional practice. Therefore, the terms should be defined on the basis of the entire content of this disclosure.

Hereinafter, a system 1000 for controlling a revolutions per minute (RPM) of a propeller and a rotor of a flight vehicle having multiple power units according to the present invention will be described with reference to the accompanying drawings.

Figure 1:
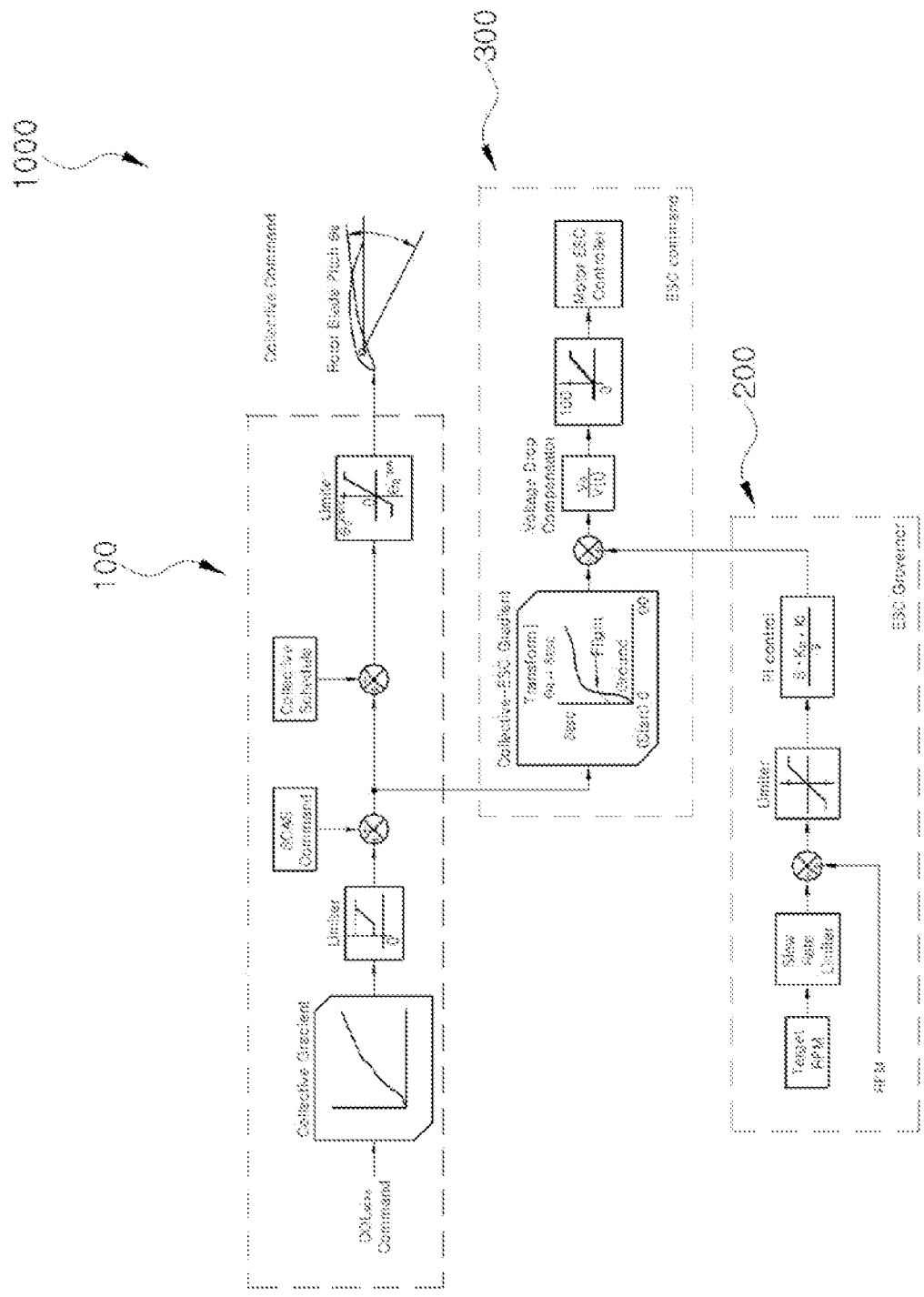
FIG. 1 is a diagram showing a system for controlling a revolutions per minute (RPM) of a propeller and a rotor of a flight vehicle having multiple power units according to the present invention.

FIG. 1 shows a system diagram showing a system 1000 for controlling an RPM of a propeller and a rotor of a flight vehicle having multiple power units according to the present invention. Referring to FIG. 1, the system 1000 for controlling an RPM of a propeller and a rotor of a flight vehicle having multiple power units may include a collective pitch angle command generating unit 100 generating a collective pitch angle command upon receiving a thrust control command ($COL_{scas}$ Command) from a pilot or an automatic controller, a disturbance factor compensating unit 200 generating an electronic speed control (ESC) command for compensating for a revolution per minute (RPM) error, and an electronic speed adjustment command generating unit 300 generating a final ESC command upon receiving a collective command input or derived in the process of generating the collective pitch angle command by the collective pitch angle command generating unit 100 and the ESC command generated by the disturbance factor compensating unit 200.

In detail, the collective pitch angle command generating unit 100 receives a thrust control command ($COL_{scas}$ Command) from a pilot or an automatic controller, adds the received thrust control command to a SCAS command of a posture controller, adds a collective schedule according to a speed, and generates a collective pitch angle command through a limiter, the disturbance factor compensating unit 200 generates an RPM compensation ESC command capable of minimizing an RPM error by inputting a signal passing through the limiter from an error of a target RPM and a real-time RPM to a proportional-integral (PI) controller, and the electronic speed adjustment command generating unit 300 generates a disturbance error compensation ESC command in which a disturbance error is compensated by adding a conversion ESC command converted to maintain a constant RPM from a collective command input from the collective pitch angle command generating unit 100 and the RPM compensation ESC command capable of minimizing the RPM error generated by the disturbance factor compensating unit 200, and generates a final ESC command through a voltage drop compensation process and the limiter.

Therefore, it is possible to control a collective pitch angle in response to the input thrust control command, it is possible to generate an ESC command to maintain the RPMs of a plurality of motors to be constant based on the command used for the collective pitch angle control, and it is also possible to reflect a disturbance factor that prevents the speed of each motor to be maintained the same a motor speed adjustment, and therefore, it is possible to prevent the RPM from being changed by an external factor.

Hereinafter, the collective pitch angle command generating unit 100, the disturbance factor compensating unit 200, and the electronic speed adjustment command generating unit 300 will be embodied with reference to the drawings.

Figure 2:
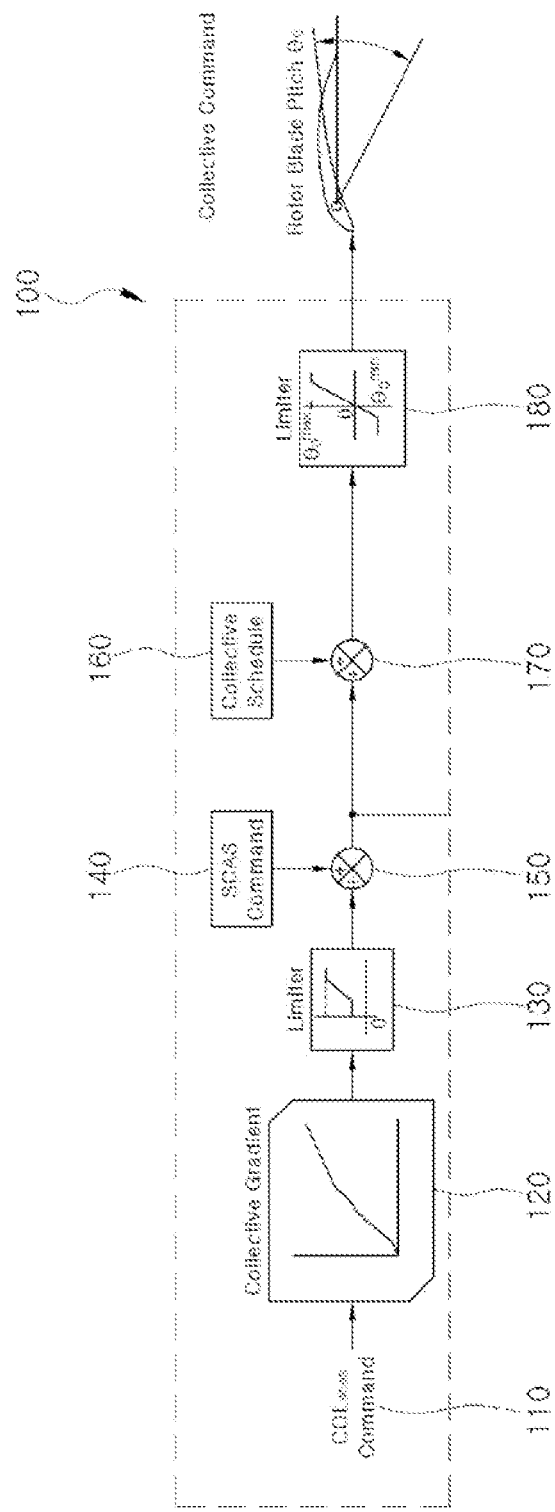
FIG. 2 is a conceptual diagram illustrating a collective pitch angle command generating unit.

FIG. 2 is a conceptual diagram illustrating the collective pitch angle command generating unit 100. Referring to FIG. 2, the collective pitch angle command generating unit 100 may include a thrust control command input unit 110 receiving a thrust control command ($COL_{scas}$ Command), an angle adjustment range determining unit 120 generating an angle adjustment command of a propeller based on a thrust control command input from the thrust control command input unit 110, a first limiter 130 generating an angle range command by limiting any one or more of an uppermost limit and a lowermost limit of the angle adjustment range determined by the angle adjustment range determining unit 120, a direct thrust control command input unit 140 receiving a direct thrust control command from a posture controller, a first command combining unit 150 generating a collective command, which is a first combination command in which the direct thrust control command input from the direct thrust control command input unit 140 and the angle range command of the propeller determined by the angle adjustment range determining unit 120 are combined, a collective schedule input unit 160 receiving a collective schedule according to an increase in speed, a second command combining unit 170 generating a second combination command in which the collective schedule input from the collective schedule input unit 160 and the collective command combined in the first command combining unit 150 are combined, and a second limiter 180 limiting a mechanical angle adjustment range of a propeller collective pitch angle based on the second combination command generated by the second command combining unit 170, wherein the collective pitch angle command is generated as the second combination command passes through the second limiter 180, and a propeller collective pitch angle of a flight vehicle is adjusted by the collective pitch angle command.

In detail, the thrust control command input to the thrust control command input unit 110, which is a first command input unit, is a command input by a pilot or an automatic controller by adjusting a thrust lever, and the thrust control command ($COL_{scas}$ Command) input through the thrust lever is converted into an angle adjustment command having an angle adjustment numerical value of the collective pitch angle corresponding to a lever adjustment through a hardware device in which a collective gradient input to the angle adjustment range determining unit 120 is stored, and the angle adjustment command converted through the angle adjustment range determining unit 120 is corrected into an angle range command positioned within a range between an uppermost value and a lowermost value of the angle adjustment, while passing through the first limiter 130, and then is input to the first command combining unit 150.

Also, when the direct thrust control command input unit 140, which is a second command input unit, inputs the direct thrust control command (SCAS Command) for each propeller of the posture controller for angle adjustment of each of a plurality of propellers attached to a flight vehicle to the first command combining unit 150, the angle range command generated by the first limiter 130 and the direct thrust control command for each propeller input from the direct thrust control command input unit 140 are combined to generate a first combination command, which is a new overall collective pitch angle adjustment command for collective pitch angle adjustment.

In addition, a collective schedule used to increase or decrease the collective pitch angle adjustment angle according to the increase in a moving speed of the flight vehicle is input from the collective schedule input unit 160 to the second command combining unit 170, and a first combination command generated through the first command combining unit 150 is added to the collective schedule input to the second command combining unit 170 to be converted into a second combination command, which is a collective pitch angle adjustment command suitable for a speed of the flight vehicle.

Thereafter, the overall collective pitch angle adjustment command that has passed through the second command combining unit 170 is limited to a collective pitch angle command, which is an overall collective pitch angle adjustment command, limiting the collective pitch angle adjustment range to a mechanical angle adjustment range of a propeller collective pitch angle, while passing through the second limiter 180, so that a collective pitch angle command, which is a final command used for a collective pitch angle adjustment, after passing through the second limiter 180, is generated.

Figure 3:
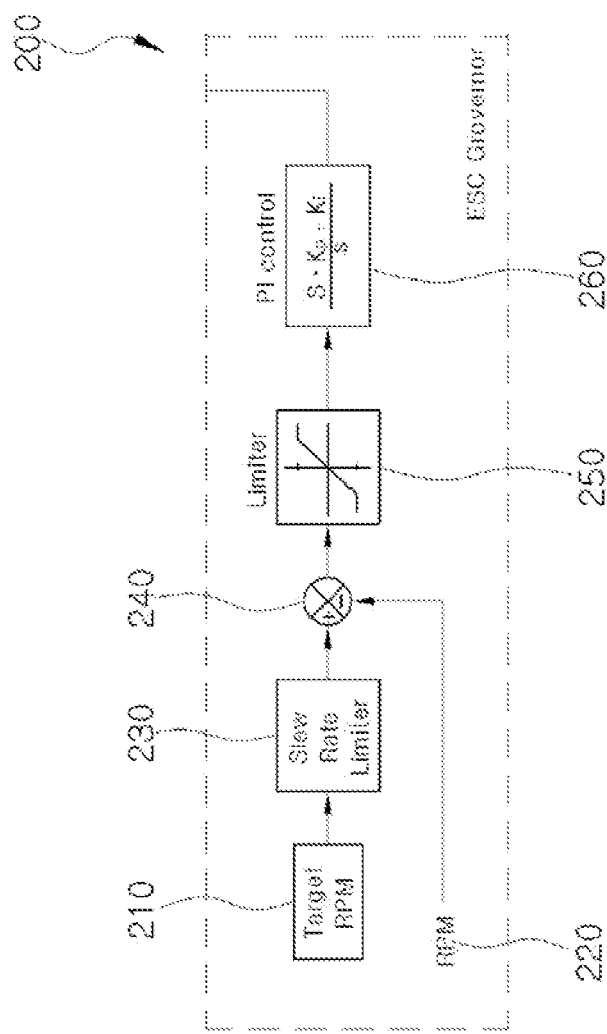
FIG. 3 is a conceptual diagram illustrating a disturbance factor compensating unit.

FIG. 3 is a conceptual diagram showing the disturbance factor compensating unit 200. Referring to FIG. 3, the disturbance factor compensating unit 200 may include a target rotation speed checking unit 210 checking a target RPM, a current rotation speed checking unit 220 measuring a real-time RPM, a rotation speed change rate limiting unit 230 smoothly changing a motor RPM to correspond to a change in a mode of the flight vehicle, a third command combining unit 240 generating an RPM compensation signal, which is a third combination command for RPM compensation from a difference between an RPM limiting signal derived through the rotation speed change rate limiting unit 230 and the current RPM measured by the current rotation speed checking unit 220, a third limiter 250 generating an RPM limiting compensation signal by limiting a range of the RPM compensation signal determined by the third command combining unit 240, and an RPM compensation ESC command generating unit 260 generating an RPM compensation ESC command having an RPM error lowered by multiplying the RPM limiting compensation signal passing through the third limiter 250 by a proportional-integral gain.

That is, disturbances such as gusts of wind or speed changes may occur during flight vehicle operation, and since this disturbance causes a change in the RPM of the flight vehicle, the change in RPM caused by disturbances is compensated for through the disturbance factor compensating unit 200.

In detail, when the RPM information set by the user is input to the target rotation speed checking unit 210 and the current rotation speed checking unit 220 measures a current RPM of the motor, i.e., a real-time RPM, the RPM information set by the user and the current RPM information of the motor are input to the third command combining unit 240 to check an RPM error, and in this case, when the target RPM is reduced to about 80% in order to increase the efficiency of the propeller in high-speed flight, or conversely, when the target RPM is returned to 100% at low speed flying, the RPM may be rapidly changed, and thus, the rotation speed change rate limiting unit 230 generates an RPM limiting signal limiting the change rate of the target RPM to gradually limit the change in RPM.

Also, the RPM compensation control signal derived by the third command combining unit 240 passes through the third limiter 250 and is changed to an RPM limit compensation signal, which is a signal whose RPM compensation range is adjusted to a limited value, and the RPM limit compensation signal that has passed through the third limiter 250 is controlled through proportional-integral (PI) control in the RPM compensation ESC command generating unit 260 to generate an RPM compensation ESC command capable of compensating for changes in RPM for disturbance factors.

At this time, the proportional-integral (PI) control of the RPM compensation ESC command generating unit 260 may generate an ESC command capable of minimizing the RPM error by multiplying the proportional-integral gain, and if there is a time delay in the input RPM measurement value, a differential gain may be added to increase a phase margin.

Figure 4:
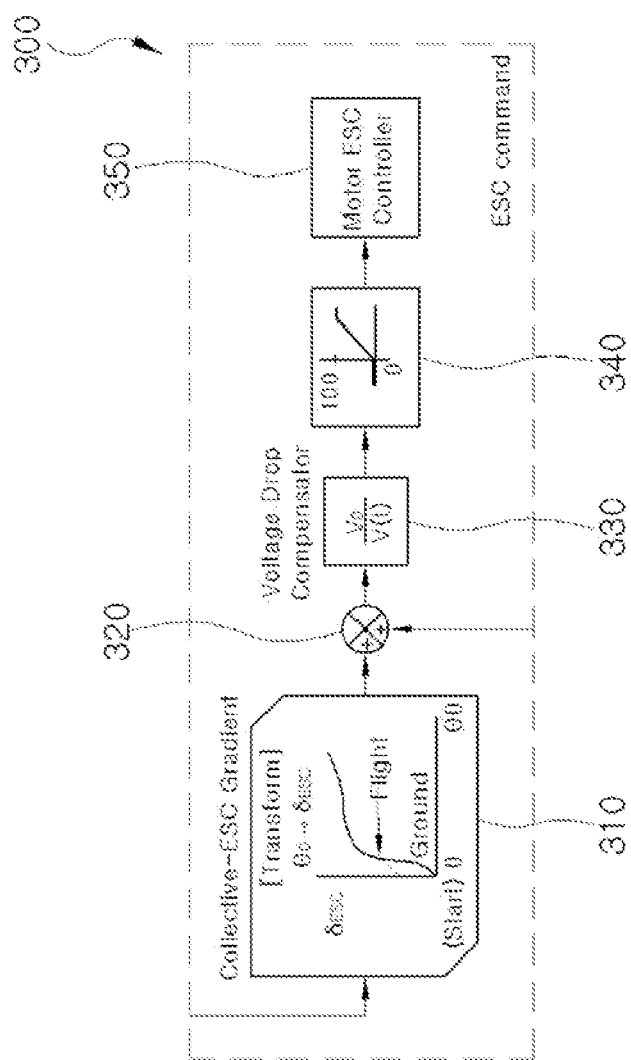
FIG. 4 is a conceptual diagram illustrating an electronic speed control command generating unit.

FIG. 4 is a conceptual diagram showing the electronic speed adjustment command generating unit 300. Referring to FIG. 4, the electronic speed adjustment command generating unit 300 may include a collective-ESC command changing unit 310 changing a collective command, which is a first combination command, generated by the first command combining unit 150, into a conversion ESC command so that a constant RPM may be maintained, a fourth command combining unit 320 generating a disturbance error compensation ESC command, which is a fourth combination command in which the RPM compensation ESC command generated by the ESC command generating unit 260 is combined, a voltage strength compensating unit 330 generating a voltage strength compensation ESC command by compensating for a voltage strength varying according to a charged amount of battery charge to a disturbance error compensation ESC command generated by the fourth command combining unit 320, and a fourth limiter 340 limiting the voltage strength compensation ESC command generated by the voltage strength compensating unit 330 to a range acceptable to the ESC controller to generate a final ESC command, and the final ESC command generated by the fourth limiter 340 is transmitted to the ESC controller 350 of the motor to control an output of the motor.

In detail, the collective-ESC command changing unit 310 generates a final ESC command capable of maintaining a constant RPM at the corresponding collective pitch angle from the collective pitch angle adjustment command of the propeller, and generates a conversion ESC command capable of maintaining an RPM upon receiving a collective command, which is an overall collective pitch angle adjustment command, from the first command combining unit 150. That is, a hardware device storing an ESC determination data (collective-ESC gradient) according to the collective pitch angle for constantly maintaining a uniform RPM is provided on the collective-ESC command changing unit 310 to generate a conversion ESC command corresponding to the input collective pitch angle, and in this case, the generated conversion ESC command may include a first command appearing in a stop mode in which the flight vehicle is located on the ground and a second command appearing in a flight mode, and in order to vary the conversion ESC command according to the mode of the flight vehicle, the ESC determination data according to the collective pitch angle may have two types of patterns corresponding to the flight mode.

Also, the conversion ESC command derived through the collective-ESC command changing unit 310 and the RPM compensation ESC command derived through the RPM compensation ESC command generating unit 260 are combined in the fourth command combining unit 320 to derive a disturbance error compensation ESC command in which the RPM change according to the disturbance factor is corrected, and the disturbance error compensation ESC command derived from the fourth command combining unit 320 passes through the voltage strength compensating unit 330 to be changed to a voltage strength compensation ESC command capable of compensating for a voltage strength varying according to the charge amount of a battery voltage, and the voltage strength compensation ESC command that has passed through the voltage strength compensating unit 330 passes through the fourth limiter 340 to be limited to a final ESC command, which is a command having a strength acceptable by the ESC controller 350 of the motor, and thereafter, a final command may be transmitted to the ESC controller 350 of the motor to adjust a rotation speed of the motor for driving each propeller.

The present invention is not limited to the above-described examples and various modifications may be made by a person skilled in the art to which the present invention pertains, without departing from the spirit of the invention as defined by the-present invention.

In the system for controlling an RPM of a propeller and a rotor of a flight vehicle, an RPM difference between the motors due to external factors is corrected through the disturbance factor compensating unit, and thus thrust of a plurality of propellers and rotors may be uniformly maintained.

In addition, after the collective-ESC command changing unit generates the converted ESC command to maintain a constant RPM from the collective pitch angle command, the disturbance factor compensating unit compensates for the RPM according to the disturbance factor secondarily, so the thrust of the propeller and the rotor may be uniformly maintained.

In addition, since the collective schedule is input, the collective pitch angle may be more precisely adjusted according to a flight speed, and the compensation command size of the disturbance factor compensating unit may be optimized.

In addition, since the collective-ESC command changing unit generates an ESC command capable of maintaining the RPM by identifying a ground state and a flight state, an ESC command suitable for each situation may be generated. That is, on the ground, when the collective command decreases to a value below idle, the RPM should decrease, but during flight, the RPM should be maintained even at a minimum collective command.

In addition, since the voltage strength is compensated for in response to a state of charge of the battery, the speed of the motor may be accurately adjusted to a value corresponding to a specified command.

In addition, since the target RPM is gradually adjusted in response to a change in the mode of the flight vehicle through the rotation speed change rate limiting unit 230, the RPM may be prevented from being changed rapidly.

In addition, the RPM compensation of the flight vehicle may be performed more quickly and accurately through the proportional integral (PI) controller.

The present invention is not limited to the aforementioned exemplary embodiments. The present invention may be applied to various fields and may be variously modified by those skilled in the art without departing from the scope of the present invention.

DETAILED DESCRIPTION OF MAIN ELEMENTS

100: collective pitch angle command generating unit
110: thrust control command input unit
120: angle adjustment range determining unit
130: first limiter
140: direct thrust control command input unit
150: first command combining unit
160: collective schedule input unit 170: second command combining unit
180: second limiter
200: disturbance factor compensating unit
210: target rotation speed checking unit
220: current rotation speed checking unit
230: rotation speed change rate limiting unit
240: third command combining unit
250: third limiter
260: RPM compensation ESC command generating unit
300: electronic speed adjustment command generating unit
310: collective-ESC command changing unit
320: fourth command combining unit
330: voltage strength compensating unit
340: fourth limiter
350: motor ESC controller

The invention claimed is:

1. A system for controlling an RPM of a propeller and a rotor of a flight vehicle having multiple power units, the system comprising:
   a collective pitch angle command generating unit configured to generate a collective pitch angle command upon receiving a thrust control command from a pilot or an automatic controller;
   a disturbance factor compensating unit configured to generate an RPM compensation electronic speed control (ESC) command for compensating for an RPM error; and
   an electronic speed adjustment command generating unit configured to generate a final ESC command upon receiving a collective command input or derived in the process of generating the collective pitch angle command by the collective pitch angle command generating unit and the RPM compensation ESC command generated by the disturbance factor compensating unit,
   wherein the collective pitch angle command generating unit includes:
      a thrust control command input unit configured to receive the thrust control command; and
      an angle adjustment range determining unit configured to generate an angle control command based on the thrust control command input from the thrust control command input unit,
   wherein the collective pitch angle command generating unit further includes:
      a direct thrust control command input unit configured to receive a direct thrust control command of a posture controller; and a first command combining unit configured to generate a collective command, which is a first combination command in which the direct thrust control command input from the direct thrust control command input unit and the angle range command generated by the first limiter are combined.

2. The system of claim 1, wherein the collective pitch angle command generating unit further includes a first limiter generating an angle range command by limiting one or more of an uppermost or lowermost limit of the angle adjustment range of the propeller based on the angle adjustment command generated by the angle adjustment range determining unit.

3. The system of claim 1, wherein
the collective pitch angle command generating unit further includes:
a collective schedule input unit configured to receive a collective schedule according to an increase in speed; and
a second command combining unit configured to generate a second combination command in which the collective schedule input through the collective schedule input unit and the collective command combined in the first command combining unit are combined.

4. The system of claim 3, wherein
the collective pitch angle command generating unit further includes a second limiter generating the collective pitch angle command by limiting a mechanical angle adjustment range of the propeller based on the second combination command generated by the second command combining unit.

5. The system of claim 1, wherein
the disturbance factor compensating unit includes:
a target rotation speed checking unit configured to check a target RPM; a current rotation speed checking unit measuring a real-time RPM; and
a rotation speed change rate limiting unit configured to generate an RPM limiting signal by changing information on the target RPM with a constant rate of change for a specified time in response to flight conditions.

6. The system of claim 5, wherein
the disturbance factor compensating unit further includes:
a third command combining unit configured to generate an RPM compensation signal, which is a third combination command for RPM compensation based on a difference between the RPM of the RPM limiting signal generated by the rotation speed change rate limiting unit and the RPM of the information on the real-time RPM measured by the current rotation speed checking unit;
a third limiter generating an RPM limit compensation signal by limiting a range of the RPM compensation signal generated by the third command combining unit; and
an RPM compensation ESC command generating unit configured to generate an RPM compensation ESC command, which lowers an RPM error, by multiplying the RPM limit compensation signal generated by the third limiter by a proportional-integral gain.

7. The system of claim 6, wherein
the electronic speed adjustment command generating unit includes:
a collective-ESC command changing unit configured to receive the collective command generated by the first command combining unit of the collective pitch angle command generating unit and changing the received collective command into a conversion ESC command so that a constant RPM is maintained.

8. The system of claim 7, wherein
the electronic speed adjustment command generating unit includes:
a fourth command combining unit configured to generate a disturbance error compensation ESC command, which is a fourth combination command, in which the RPM compensation ESC command generated by the RPM compensation ESC command generating unit of the disturbance factor compensating unit and the conversion ESC command generated by the collective-ESC command changing unit are combined;
a voltage strength compensating unit configured to generate a voltage strength compensation ESC command by compensating for a voltage strength varying depending on a battery charge amount according to the disturbance error compensation ESC command generated by the fourth command combining unit; and a fourth limiter generating a final ESC command by limiting the voltage strength compensation ESC command generated by the voltage strength compensating unit to a range acceptable to an ESC controller of the motor.

9. The system of claim 8, wherein the final ESC command generated by the fourth limiter is transmitted to the ESC controller of the motor.

\* \* \* \* \*